(12) United States Patent
Chan

(10) Patent No.: US 6,304,233 B1
(45) Date of Patent: Oct. 16, 2001

(54) ANTENNA CONNECTOR OF CELLULAR PHONE

(76) Inventor: Tien-Chin Chan, No. 40, Minfu 1st St., Taoyuan City, Taoyuan (TW)

( * ) Notice: Subject to any disclaimer, the term of this patent is extended or adjusted under 35 U.S.C. 154(b) by 0 days.

(21) Appl. No.: 09/573,666

(22) Filed: May 19, 2000

(51) Int. Cl.[7] ............................... H01R 4/54; H01Q 1/50
(52) U.S. Cl. ............................................ 343/906; 343/702
(58) Field of Search ................................... 343/702, 906; 455/90

(56) References Cited

U.S. PATENT DOCUMENTS

| | | | |
|---|---|---|---|
| 5,015,194 | * | 5/1991 | Seas ........................................ 439/314 |
| 5,949,386 | * | 9/1999 | Elliott ..................................... 343/906 |

* cited by examiner

Primary Examiner—Don Wong
Assistant Examiner—James Clinger
(74) Attorney, Agent, or Firm—Rosenberg, Klein & Lee

(57) ABSTRACT

The present invention proposes an improved antenna connector of a cellular phone. The antenna comprises a sleeve spindle, a base, and a compression spring. The present invention is characterized in that a plugging hole is disposed on the top end of the sleeve spindle of the antenna so that a first connector at one end of a signal adapting wire can be plugged therein. The first connector can penetrate into the compression spring and contact with the compression spring so that the signal adapting wire can connect the cellular phone to a car antenna. Noise interference can be prevented when the cellular phone is used in the car so as to achieve better transmission quality. Easy and convenient use can thus be achieved. Destruction of the antenna and the possibility that the antenna is lost can also be effectively avoided. Moreover, the structure of the present invention is very simple so that production cost can be greatly reduced.

4 Claims, 4 Drawing Sheets

ANTENNA CONNECTOR OF CELLULAR PHONE

FIELD OF THE INVENTION

The present invention relates to an improved antenna connector of a cellular phone and, more particularly, to a connector facilitating the connection of a signal adapting wire and a cellular phone.

BACKGROUND OF THE INVENTION

As shown in FIG. 1, an antenna 10 of a cellular phone in prior art comprises a sleeve spindle 11, a base 12, and a compression spring 13. The base 12 is received in the sleeve spindle 11. The bottom end of the base 12 protrudes out of the sleeve spindle 11 to form a plugging shaft 14 to be plugged in the cellular phone. The compression spring 13 is received in the sleeve spindle 11 and can be used as a conductor for telephone signals. The bottom end of the compression spring 13 contacts with the base 12.

When the cellular phone is used in a car, a signal adapting wire of the cellular phone is generally connected to an antenna installed on the car to avoid noise interference so as to acquire better transmission quality. In prior art, when the signal adapting wire of a cellular phone is used, the detachable antenna of the cellular phone needs to be detached first, and a connector of the signal adapting wire is then plugged in the cellular phone. Next, a connector at the other end of the signal adapting wire is plugged in a connection seat of the car antenna. Through the connection of the cellular phone and the car antenna via the signal adapting wire, noise interference can be prevented when the cellular phone is used in the car. Moreover, transmission quality will be better because there is less landform interference.

However, for the antenna of the cellular phone in prior art, when the signal adapting wire is to be connected, the detachable antenna of the cellular phone needs to be detached first so that a connector of the signal adapting wire can then be plugged in the cellular phone. Because the antenna of the cellular phone is a delicate component, constant detaching and plugging result in a trouble, and destruction of the antenna may easily arise. Moreover, the antenna with a small volume may be easily lost after detached from the cellular phone, resulting in a great problem to the user.

SUMMARY AND OBJECTS OF THE PRESENT INVENTION

The primary object of the present invention is to provide an improved antenna connector of a cellular phone, wherein a plugging hole is disposed on the top end of a sleeve spindle of an antenna so that a first connector at one end of a signal adapting wire can be plugged therein. The first connector can penetrate into a compression spring of the antenna and contact with the compression spring so that the signal adapting wire can connect the cellular phone to a car antenna. The present invention can directly plug the first connector of the signal adapting wire in the antenna. The antenna of the cellular phone needs not to be detached so that constant detaching and plugging of the antenna is not required. Easy and convenient use can thus be achieved. Destruction of the antenna and the possibility that the antenna is lost can also be effectively avoided. Moreover, the structure of the present invention is very simple so that production cost can be greatly reduced.

The various objects and advantages of the present invention will be more readily understood from the following detailed description when read in conjunction with the appended drawings, in which:

DETAILED DESCRIPTION OF PREFERRED EMBODIMENT

Figure 1:
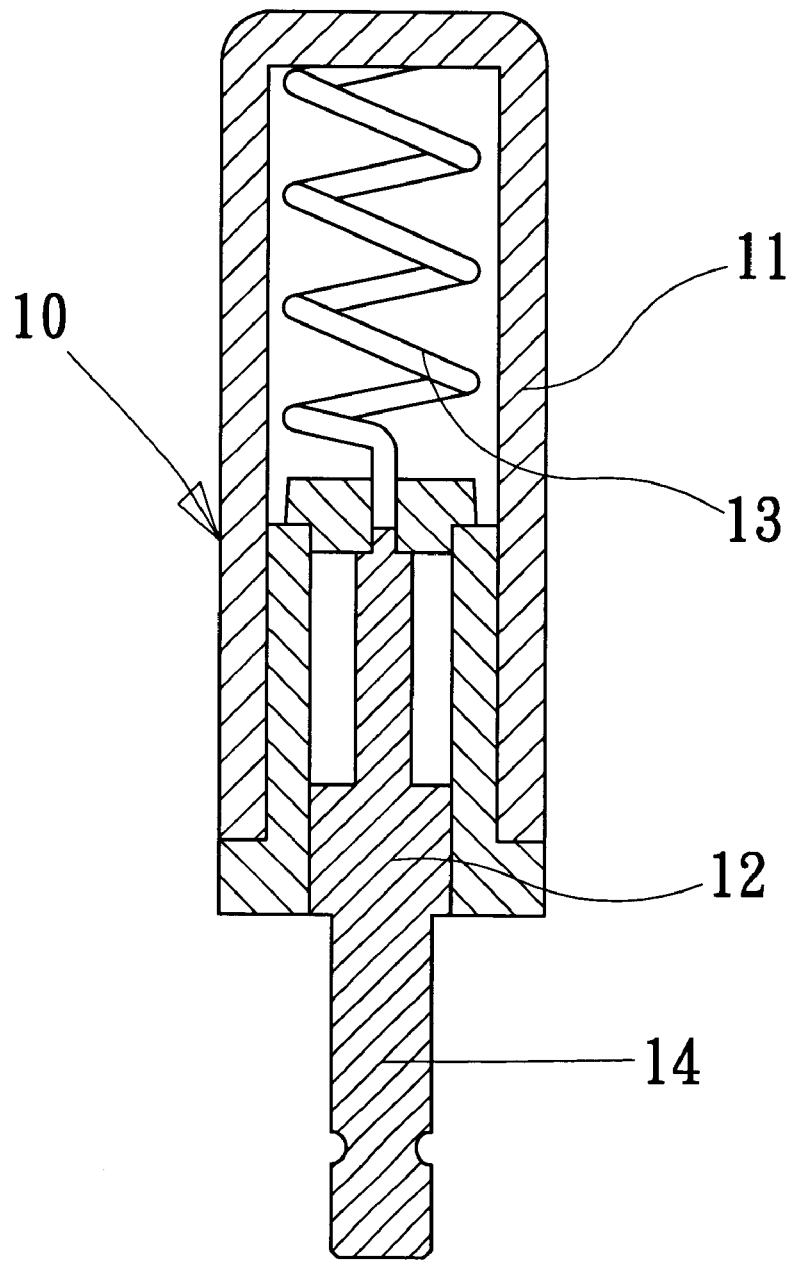
FIG. 1 is a cross-sectional view of an antenna of a cellular phone in prior art.
Figures 2, 2A:
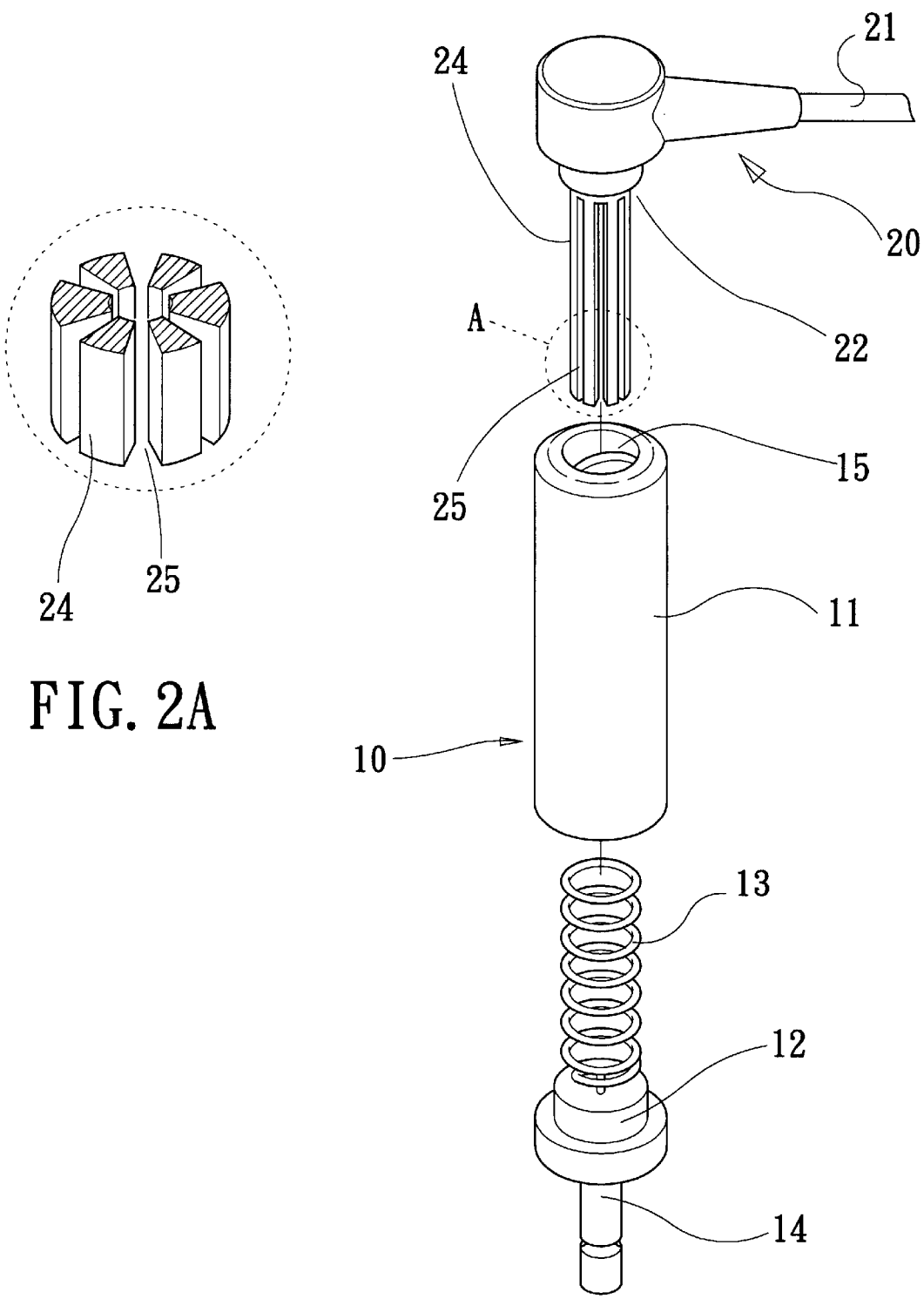
FIG. 2 is an exploded perspective view of the present invention.
FIG. 2A is a perspective cross-sectional view of a plugging part of the signal adapting wire of the present invention.
Figure 3:
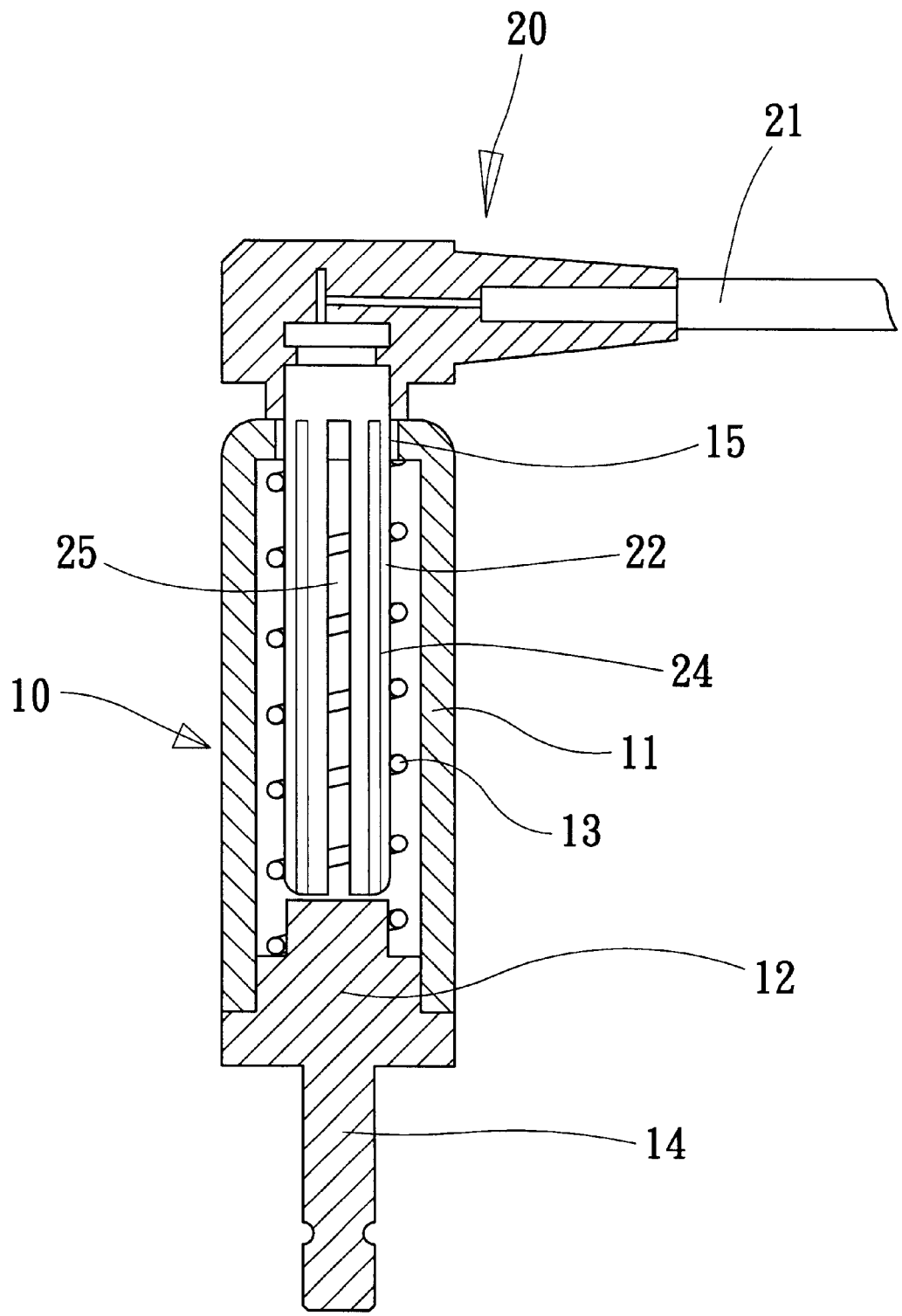
FIG. 3 is a cross-sectional view of the present invention.

As shown in FIGS. 2 and 3, the present invention provides an improved antenna connector of a cellular phone. An antenna 10 of a general cellular phone 30 (shown in FIG. 4) comprises a sleeve spindle 11, a base 12, and a compression spring 13. The sleeve spindle 11 is made of plastic material and is of hollow cylindrical shape with an opening at the bottom end thereof. The abase 12 is received and fixed in the sleeve spindle 11. The bottom end of the base 12 protrudes out of the sleeve spindle 11 to form a plugging shaft 14 to be plugged in the cellular phone. The sleeve spindle 11 is formed outside of the compression 13 spring by mold injection to receive the compression spring 13 therein. The compression spring 13 is further mounted in the inner wall of the sleeve spindle 11 to be used as a conductor for telephone signals. The bottom end of the compression spring 13 further contacts with the top end of the base 12. The present invention is characterized in that a plugging hole 15 is disposed on the top end of the sleeve spindle 11 of the antenna 10. The plugging hole 15 penetrates through the top end of the sleeve spindle 11 and corresponds to the compression spring 13 so as to form an antenna connector to be directly plugged by the signal adapting wire 20. The antenna 10 has the function of an antenna of a cellular phone when not connected to the signal adapting wire 20.

The signal adapting wire 20 has a conductive wire 21. One end of the conductive wire 21 is connected to a first connector 22 to be plugged in the antenna 10 of the cellular phone. The other end of the conductive wire 21 is connected to a second connector 23 (shown in FIG. 4) to be plugged in a connection seat of a car antenna 40. The first connector 22 has a tubular plugging part 24 made of copper material. The plugging part 24 is connected to the conductive wire 21 to form an assembly. A plurality of cut grooves 25 are axially disposed on the plugging part 24, as shown in FIG. 2A. Through the help of the cut grooves 25, the outer diameter of the plugging part 24 can be resiliently changed.

Figure 4:
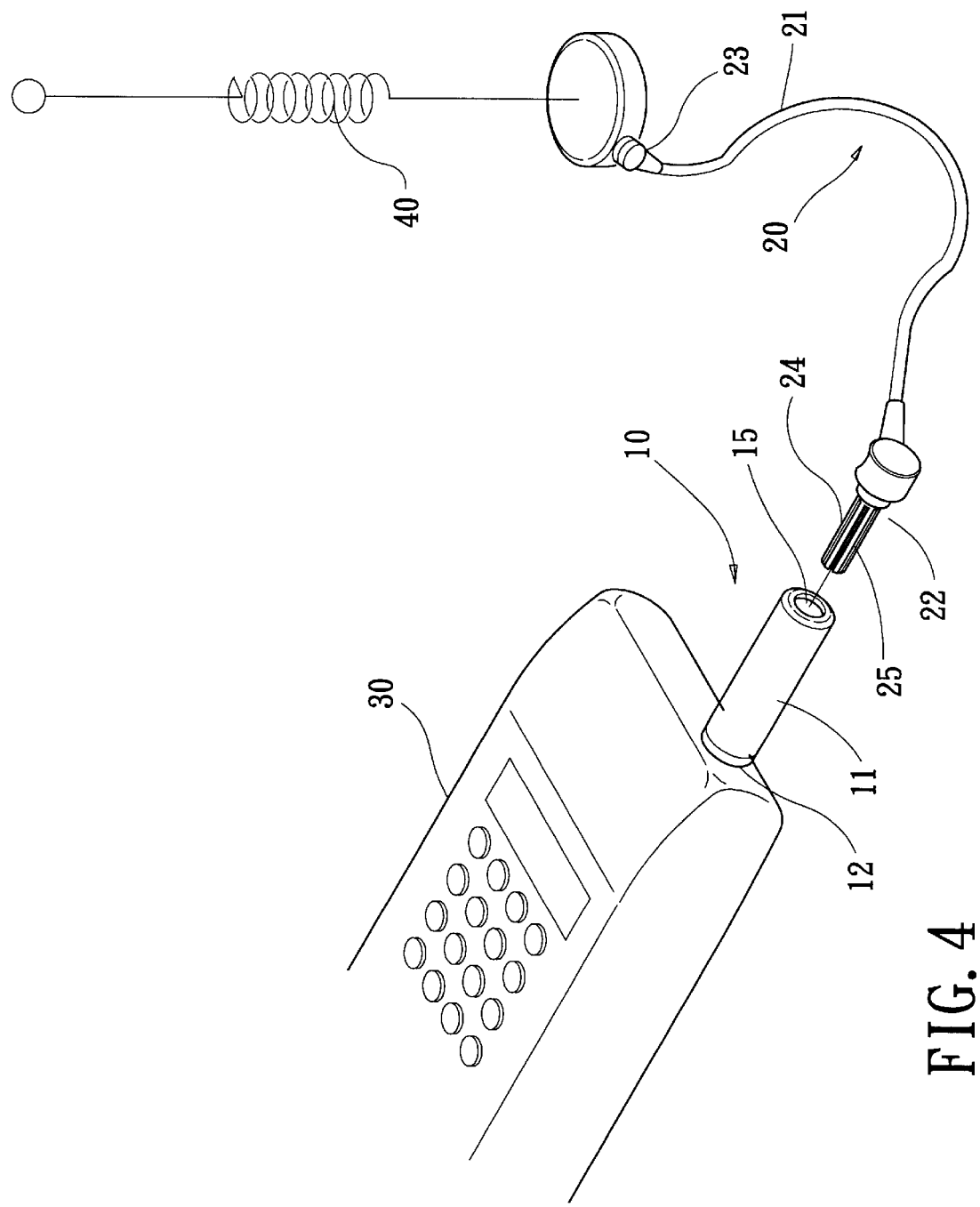
FIG. 4 is a diagram showing the use state of the present invention.

As shown in FIG. 4, when the signal adapting wire 20 of the present invention is used, the antenna 10 of the cellular phone 30 needs not to be detached. The first connector 22 at one end of the signal adapting wire 20 can be directly plugged in the antenna 10. Speaking in more detail, the plugging part 24 of the first connector 22 of the signal adapting wire 20 is plugged in the plugging hole 15 on the top end of the sleeve spindle 11 of the antenna 10, as shown in FIG. 3. The plugging part 24 of the first connector 22 penetrates into the compression spring 13 and contacts with the inner edge of the compression spring 13 to facilitate signal transmission. Through the connection of the cellular phone 20 and the car antenna 40 via the signal adapting wire 20, noise interference can be prevented when the cellular phone is used in the car. Moreover, transmission quality will be better because there is less landform interference.

When the present invention is used, the first connector 22 of the signal adapting wire 20 can be directly plugged in the antenna 10. The antenna 10 of the cellular phone needs not to be detached so that constant detaching and plugging of the antenna is not required. Easy and convenient use can thus be achieved. Destruction of the antenna and the possibility that the antenna is lost can also be effectively avoided. Besides, only a plugging hole 15 is required to be disposed on the antenna 10 of the general cellular phone 30 so as to achieve the object of connecting the signal adapting wire 20. Therefore, the structure of the present invention is very simple, and production cost can be greatly reduced.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A combined antenna and connection assembly for a cellular telephone comprising:

(a) an electrically conductive base, said base having a plugging shaft extending axially downward therefrom;

(b) a sleeve spindle coupled to said base, said sleeve spindle defining an inner compartment extending axially upward from said base, said sleeve spindle including a top end portion having formed therethrough a plugging hole communicating with said inner compartment; and, (c) an antenna element captured within said inner compartment of said sleeve spindle, said antenna element being coupled to said base, said antenna element having a compression spring configuration extending axially upward through said inner compartment for retentively engaging in coaxial manner a connection plug passed through said plugging hole.

2. The combined antenna and connector assembly as recited in claim 1 further comprising a first connector for electrically coupling an auxiliary antenna to the cellular telephone, said first connector including a resilient plugging part having a substantially tubular configuration for coaxially engaging said antenna element in detachable manner.

3. The combined antenna and connector assembly as recited in claim 2 wherein said plugging part has formed therein a plurality of deflectable members defined by a plurality of axially extended cut grooves.

4. The combined antenna and connector assembly as recited in claim 3 wherein said antenna element defines a central axial space coaxially receiving said first connector plugging part, at least a portion of said plugging part being deflected radially inward by said antenna element.

* * * * *